United States Patent

[11] 3,545,777

| [72] | Inventor | Max Friedheim |
| | | 8652 Le Berthon, Los Angeles, California |
| [21] | Appl. No. | 704,409 |
| [22] | Filed | Feb. 9, 1968 |
| [45] | Patented | Dec. 8, 1970 |

[54] RAPID-CHANGE CHUCK OR TOOL HOLDER
2 Claims, 6 Drawing Figs.

[52] U.S. Cl. .................................................. 279/99,
279/7
[51] Int. Cl. .................................................. B25g 3/30
[50] Field of Search .................................................. 85/36;
151/7; 279/1(SJ), 1(N), 1(A), 1(ME), 1, 99, 7,
103; 285/40, 334.4; 287/117, 125

[56] References Cited
UNITED STATES PATENTS

| 2,125,570 | 8/1938 | Ice .................................. | 285/40 |
| 2,167,558 | 7/1939 | Upson .......................... | 85/36X |
| 3,364,807 | 1/1968 | Holton ......................... | 85/36 |

*Primary Examiner*—Theron E. Condon
*Assistant Examiner*—Donald D. Evenson
*Attorney*—Herzig and Walsh ABSTRACT: The invention is a rapid-change or universal chuck or tool holder adapted for use on spindles of motors for holding tools, such as buffing tools or dental brushes, and the like. The device may be referred to as a chuck or a chuck adapter. It is made of a soft material, such as aluminum. It has an axial bore which is tapered at one end. In one end of this bore is fitted the hardened steel chuck or spindle on which the tool is attached, such as by threading. The other end of the bore is tapered and is provided with equiangularly spaced axial grooves or notches, and also a plurality of interrupted circumferential notches or grooves that intersect the axial grooves at axially spaced intervals. This makes it possible to fit the chuck or adapter onto a threaded spindle and to cut threads into the tapered bore of the chuck so that it is held on to the threaded spindle or shaft. This makes it easy to remove and attach the chuck or adapter and it is adapted for use on different size threaded spindles, including tapered spindles.

PATENTED DEC 8 1970

3,545,777

INVENTOR
MAX FRIEDHEIM
BY
Herzig, Walsh & Blackham
ATTORNEYS.

RAPID-CHANGE CHUCK OR TOOL HOLDER

SUMMARY OF THE INVENTION

The device of the invention is a novel and improved rapid-change, or universal chuck or adapter which serves the purpose of a tool holder.

In the preferred form of the invention, it takes the form of a chuck or adapter of cylindrical configuration made of a soft material, such as aluminum and having an axial bore. The axial bore is tapered at one end and in this tapered bore there are equiangularly spaced axial notches or grooves. Also there are provided interrupted circumferential notches or grooves that intersect the axial notches at axially spaced intervals. The end of the bore which is not tapered is adapted to receive frictionally, the end of a hardened steel chuck or spindle which is threaded and onto which is threaded the tool being held. The tapered end of the chuck or adapter may be fitted over a threaded shaft or spindle of various sizes and threads cut into the soft material of the chuck or adapter, this function being facilitated by the axial grooves and the interrupted circumferential grooves or notches which permit the threaded stem to start cutting a thread into the tapered bore. The chuck or adapter may, of course, also be fitted onto tapered shafts or mandrels in a similar manner.

The primary utility, although it is not so limited, is for use in connection with the holding of tools for buffing, or dental brushes, or comparable tools used in the jewelry trade, or in other industrial applications, or home uses.

In the light of the foregoing, the primary object of the invention is to provide a novel and improved shuck or tool holder which facilitates easy and rapid attachment and removal from a shaft and which is adapted for use with different sizes of shafts which may be either cylindrical or tapered.

Another object is to provide a chuck as in the foregoing object having a tapered axial bore having angularly spaced axial notches in its sidewalls to facilitate the rapid fitting of the chuck holder onto a threaded shaft, and whereby the shaft can be made to cut threads into the tapered bore for holding the chuck in position.

Another object is to provide a chuck as in the foregoing, wherein the tapered bore has a plurality of interrupted circumferential grooves or notches intersecting the axial grooves at axially spaced intervals in order to facilitate the cutting of threads in the tapered bore.

Further objects and additional advantages of the invention will become apparent from the following detailed description of the annexed drawings, wherein.

Figure 1:
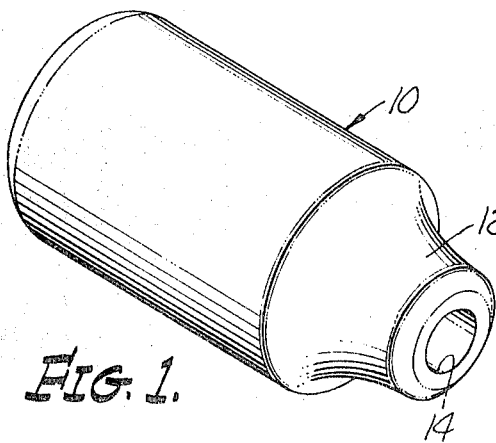
FIG. 1 is a perspective view of a preferred form of the chuck without the steel spindle or mandrel in place.
Figure 2:
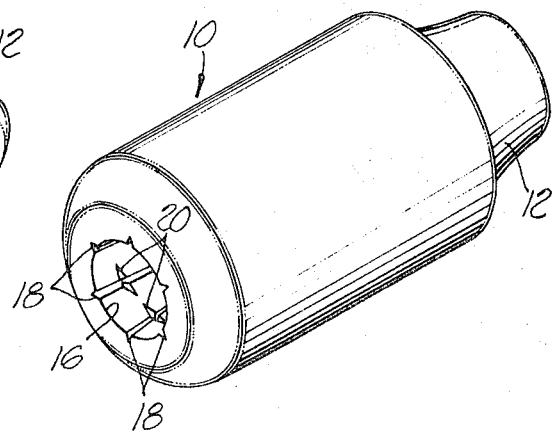
FIG. 2 is a perspective view showing the opposite end of the member of FIG. 1.
Figure 3:
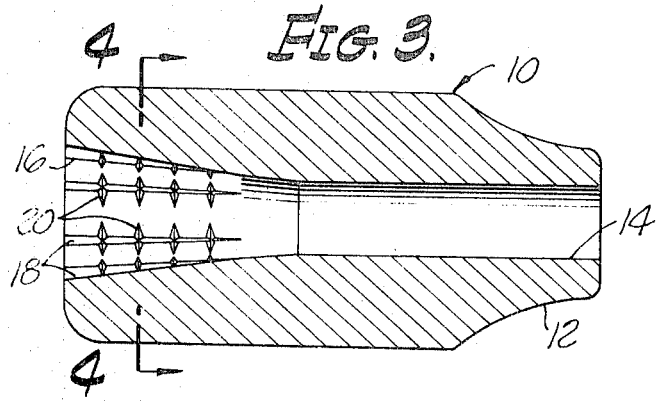
FIG. 3 is a sectional view of the chuck of FIGS. 1 and 2.
Figure 4:
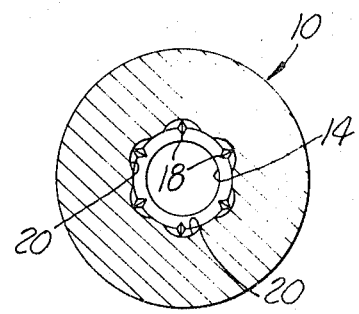
FIG. 4 is a sectional view of the chuck of FIG. 3 taken along line 4–4.
Figure 5:
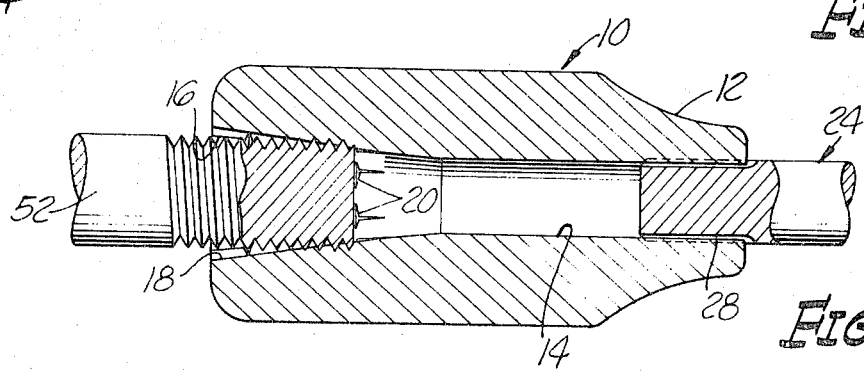
FIG. 5 is a sectional view showing the position of the hardened steel spindle or mandrel in the chuck or adapter, and also the end of the motor shaft.

The device of the invention may be referred to as a chuck or a chuck adapter in the sense that it is a member into which a hardened steel chuck or mandrel may be fitted with the tool secured on this mandrel. In the FIGS. numeral 10 designates a cylindrical chuck member made of a soft metal, such as aluminum and being tapered at one end, as shown at 12. The chuck member has an axial bore of uniform diameter at one end as shown at 14, this bore being tapered at the other end as shown at 16. The bore 16 is tapered at a suitable angle which may vary within a range of a few degrees to adapt it for the reception of threaded stems of various diameters. Formed in the sidewalls of the bore 16 are a plurality of equiangularly spaced axial grooves or notches 18 which extend along the tapered bore. In the device shown there are six of these axial notches which may be V-shaped in cross section, for example. Preferably in the device shown there are also provided a plurality of interrupted circumferential grooves which intersect the axial grooves 18 transversely, as shown at 20, the circumferential notches or grooves being uniformly spaced along the axial notches for purposes which will be described presently.

The bore 14 is adapted to frictionally receive the end of a hardened steel chuck, spindle or mandrel, as designated at 24. This chuck or mandrel has a part 26 of uniform diameter, the end of which is knurled as shown at 28. (See FIG. 6) It has a part 30 which is tapered and an end or tip part which is of uniform diameter and threaded, as shown at 40 so that the hub of a tool, such as a buffing wheel as indicated at 42 can be threaded onto this tip. The end of the chuck or mandrel 24 which is knurled is inserted into the bore 14 of the chuck member 10 of soft material and thus the mandrel 24 is firmly held in a position with its axis aligned with the axis of the member 10.

Figure 6:
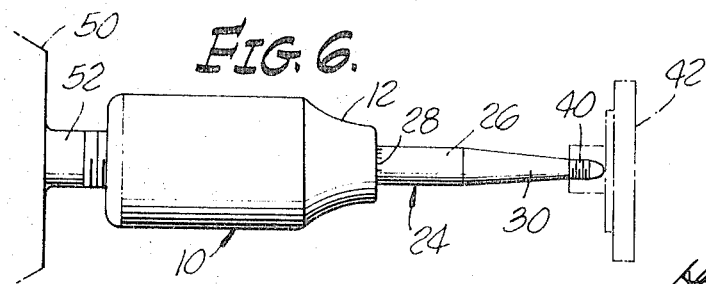
FIG. 6 is a view of the chuck of the invention mounted on a threaded stem and with a tool in place.

The chuck or adapter 10 is adapted for rapid fitting onto and removal from shafts or stems of different sizes. In FIG. 6 numeral 50 designates a drive motor having a shaft 52 which is threaded. In use, the chuck or chuck adapter 10 is fitted onto the shaft 52 merely by inserting the shaft into the tapered bore 16. The chuck may then be firmly affixed to the shaft 52 by axially urging it on and rotating it such that the steel threaded shaft 52 cuts threads into the tapered bore 16 for a limited distance determined by the angle of the taper of the bore sufficient so that chuck 10 is threaded onto the shaft 52 and is firmly held thereon while in use. The axial notches or grooves 18 and the interrupted circumferential notches 20 facilitate the capability of the threaded stem or shaft 52 to begin to cut a thread into the tapered bore 16 in the soft material of the chuck or adapter 10. Thus it may be readily seen that the chuck, although it is of an inexpensive and economical type, readily adapts itself to quick fitting onto a shaft and removal therefrom. Furthermore, it adapts itself to this quick fitting on and removal from shafts of different sizes and, of course, may be used with cylindrical or tapered shafts.

From the foregoing, those skilled in the art will readily observe and understand the nature and construction of the invention and the manner in which it achieves and realizes all of the objects and advantages as enumerated in the foregoing, as well as many additional advantages that are apparent from the detailed description.

The foregoing disclosure is representative of a preferred form of the invention, and is to be interpreted in an illustrative rather than in a limiting sense, the invention to be accorded the full scope of the claims appended hereto.

I claim:

1. A universal chuck adapter adapted for mounting on any threaded shaft comprising in combination, a generally cylindrical member having an extending part to which a tool may be affixed, said member having an axial bore opening at an end of the member, the said axial bore being tapered, the said tapered bore having a plurality of axially extending angularly spaced grooves, and short circumferentially extending notches in said bore, said notches extending across said axially extending grooves and being axially spaced along said axial grooves to facilitate the forming of a thread in said bore, the said member being made of a relatively soft metal whereby a threaded stem can be inserted into the tapered bore and the member threaded onto the threaded stem with threads being formed in the relatively soft material of the tapered bore.

2. An article of manufacture as in claim 1 wherein the said member is made of aluminum.